(12) United States Patent
Lautenschläger et al.

(10) Patent No.: US 7,489,879 B2
(45) Date of Patent: Feb. 10, 2009

(54) LASER DEVICE FOR OPTICAL DATA TRANSMISSION

(75) Inventors: Wolfram Lautenschläger, Sachsenheim (DE); Francois Dorgeuille, Paris (FR); Nicolas Le Sauze, Bures-sur-Yvette (FR); Arnaud Dupas, St-Michel-sur-Orge (FR)

(73) Assignee: Alcatel, Paris (FR)

( * ) Notice: Subject to any disclaimer, the term of this patent is extended or adjusted under 35 U.S.C. 154(b) by 650 days.

(21) Appl. No.: 10/873,286

(22) Filed: Jun. 23, 2004

(65) Prior Publication Data

US 2005/0013617 A1   Jan. 20, 2005

(30) Foreign Application Priority Data

Jul. 17, 2003   (EP) .................... 03291778

(51) Int. Cl.
*H04J 14/00*   (2006.01)
(52) U.S. Cl. .................... 398/194; 398/75
(58) Field of Classification Search .......... 398/197, 398/94, 75
See application file for complete search history.

(56) References Cited

U.S. PATENT DOCUMENTS 5,530,712 A * 6/1996 Solina et al. .................... 372/31
6,535,313 B1 * 3/2003 Fatehi et al. .................... 398/101
6,590,686 B1   7/2003 Sekiya et al.
6,731,877 B1 * 5/2004 Cao .................... 398/91
6,765,942 B2 * 7/2004 Robertson .................... 372/38.02

FOREIGN PATENT DOCUMENTS

EP   0 683 552 A2   11/1995

OTHER PUBLICATIONS

Nagle, "Digital Control System Analysis and Design", copyrighted 1984, p. 78-79.*

* cited by examiner

*Primary Examiner*—Kenneth N Vanderpuye
*Assistant Examiner*—Danny W. Leung
(74) *Attorney, Agent, or Firm*—Sughrue Mion, PLLC

(57) ABSTRACT

A Laser device for optical packet data transmission in TDM-systems is provided. The device comprises a laser light source for outputting laser light beam and a laser driver for driving the laser light source; an optical modulator which receives and modulates the laser light beam output by the laser light source; a packet data source for outputting a packet data stream; and a modulator driver for receiving the packet data stream output by the packet data source and for driving the optical modulator in response to the packet data stream resulting in that the optical modulator modulates the laser light beam in response to the packet data stream. A filter generates an envelope signal of the data packets in the packet data stream, and a switch switches the laser driver in response to the envelope signal.

9 Claims, 3 Drawing Sheets

LASER DEVICE FOR OPTICAL DATA TRANSMISSION

BACKGROUND OF THE INVENTION

The invention is based on a priority application EP 03291778.3 which is hereby incorporated by reference.

The invention relates to a laser device for optical packet data transmission in burst mode system and to an optical transmitter in such a system.

Such laser devices and optical transmitters are basically known in the art. In particular, known laser devices comprise a loser light source for outputting a laser light beam and a laser driver for driving said laser light source. The known laser devices further comprise an optical modulator means for receiving the laser light beam output by said laser light source and a packet data source for outputting a packet data stream. Moreover, they comprise a modulated driver for receiving said packet data stream output by said packet data source and for driving or controlling said optical modulator means in response to said packet data stream resulting in that the optical modulator means modulates the laser light beam in response to said packet data stream.

The optical modulator means presently available on the market, suffer from the disadvantage that they are not able to completely close their light output even if they are driven by a shut-off signal, for example represented by a logical zero. This is because they only have a low extinction ratio. Consequently, there remains a residual light which is output by said optical modulator means, for example onto an optical fiber, even if an logical zero shall be transmitted.

If there is only one of these laser devices provided in a telecommunication system that residual light does not cause any difficulties in correctly detecting the transmitted logical value, in particular a logical zero, because a threshold value for detecting the transmitted logical zero might be adapted appropriately.

However, in dense wavelength division multiplex DWDM-systems being operated in a burst mode, a plurality of laser devices operate at the some wavelength and they all transmit the modulated laser beam via the same channel. Consequently, on the channel the outputs of all of said laser devices, more exactly of said optical modulator means are summed up. Thus, there occurs the problem, that if quite a lot of said laser devices or modulator means output said residual light, representing a logical zero, simultaneously, these residual lights are summed up on the channel and might be wrongly detected as logical "1" by a receiver receiving said laser beam.

SUMMARY OF THE INVENTION

Starting from that prior art, it is the object of the invention to improve a known laser device and optical transmitter for optical packet data transmission in TDM-systems such that a sufficient high extinction ratio can be achieved.

That object is solved by a Laser device for optical packet data transmission in TDM-systems, comprising: a laser light source for outputting laser light beam and a laser driver for driving said laser light source; an optical modulator means for receiving and modulating the laser light beam output by said laser light source; a packet data source for outputting a packet data stream; and a modulator driver for receiving said packet data stream output by said packet data source and for driving said optical modulator means in response to said packet data stream resulting in that the optical modulator means modulates the laser light beam in response to said packet data stream; wherein a filter means for generating an envelope signal of the data packets in said packet data stream; and a switching means for switching the laser driver in response to said envelope signal(es). In particular, the laser device described above is characterized according to the invention by a filter means for generating an envelope signal of the data packets in said packet data stream; and by a switching means for switching the laser driver in response to said envelope signal.

Advantageously, according to the invention the laser source is switched on and off in response to the envelope signal of the data packets of said data stream. In particular, it is switched on when a packet shall be transmitted and it is switched off if no packet is transmitted. Because of the specific architecture of the laser device according to the invention, in particular because of the switching of said laser source a definite switching of the laser beam is achieved. If the laser light source is switched off it does —in contrast to an optical modulator means—definitely not emit any residual laser light. Consequently, in that case also the downstream optical modulator means does not emit any residual laser light in that case. Thus, even in the case that for example in a burst mode system a plurality of loser devices are connected to the same channel and are switched off simultaneously there will not occur an undesired logical level on the channel caused by a superposition or a summing up of residual lights. Expressed in other words: the extinction ratio of the laser device according to the invention and in particular of the optical modulator is sufficient high enough, even for being used in burst mode systems.

According to a preferred embodiment, instead of gaps filler patterns are provided between packet data in the packet data stream. These filler patterns are provided for making sure that a constant component of the data stream does not vary over the time, in particular not over different time slots. Because said constant component is kept constant, it does not transmit any information and consequently there is no need that said constant component is transmitted correctly. Thus, available low-priced modulator drivers might be used within said laser device, even if they are not able to keep said constant component constant during transmission.

It is further advantageous to embody the laser light source as a dual power consuming unit comprising at least two power consuming elements and to embody the laser driver as differential driver for driving both elements in a complementary manner in response to the envelope signal. This is advantageous, because the laser light source suffers from thermal expansion, if it is switched on and from thermal concentration, if it is switched off. Said fluctuations of the thermal expansion cause a proportional variation of the distance between two opposing mirrors within the laser light source and thus causing variations in the wavelength of the laser light emitted by said laser light source because the distance of said opposing mirrors is responsible for said wavelength. Variations in the wavelength cause problems in the correct detection of a transmitted signal, in particular in wavelength multiplex systems where a plurality of laser devices transmit in particular packet data streams modulated onto different carrier frequencies (wavelengths) via the same channel. However, due to the described embodiment of the laser light source as dual power consuming unit, that disadvantages of varying thermal expansion and varying wavelengths can be avoided. The laser frequency becomes stable within a time scale compatible with the optical packet duration.

The above identified object is further solved by another laser device and by an optical transmitter for both of the claimed laser devices. The advantages of said solutions correspond to the advantages mentioned above referring to the first claimed laser device.

BRIEF DESCRIPTION OF THE DRAWINGS

The description is accompanied by five figures, wherein.

DETAILED DESCRIPTION OF THE DRAWINGS

In the following the invention is described in more detail by referring to the above identified figures.

FIRST EMBODIMENT

Figure 1:
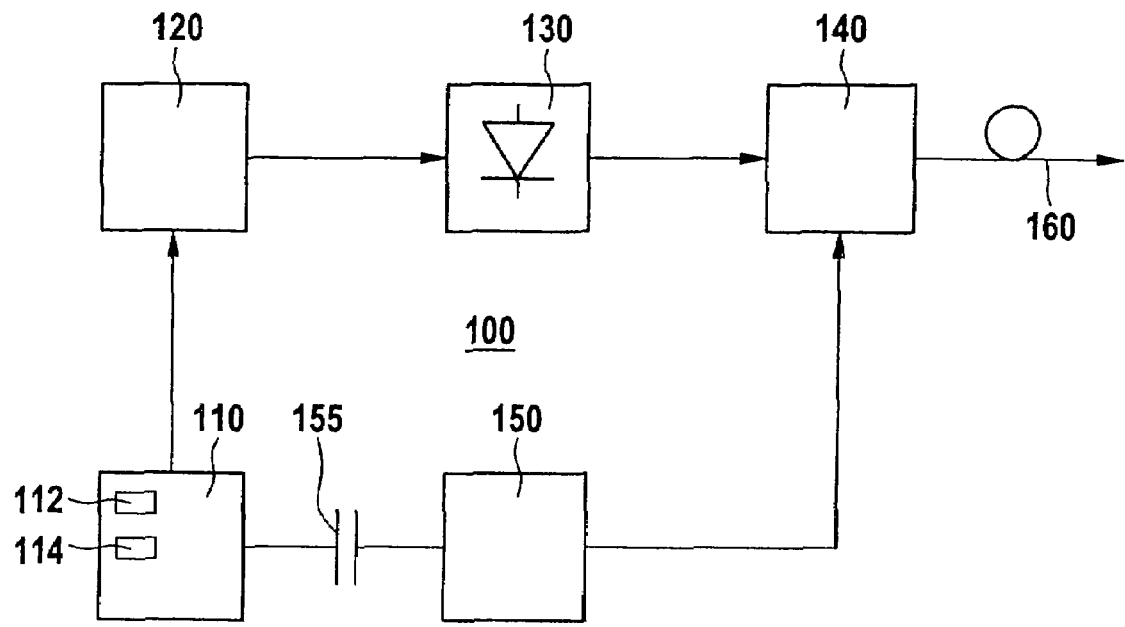
FIG. 1 shows a first embodiment of the laser device according to the inventions.

FIG. 1 shows a first embodiment of the laser device 100 for optical packet data transmission in a TDM-system, in particular in a DWDM-system according to the invention. Said laser device comprises a laser light source 130 for outputting a laser light beam and a laser driver 120 for driving said laser light source 130. The laser device 100 further comprises an optical modulator means 140 for receiving and modulating the laser light beam output by said laser light source 130. The optical modulator means 140 might be connected to an optical fiber 160 and may output the modulated laser light beam onto said fiber.

Figure 2B:
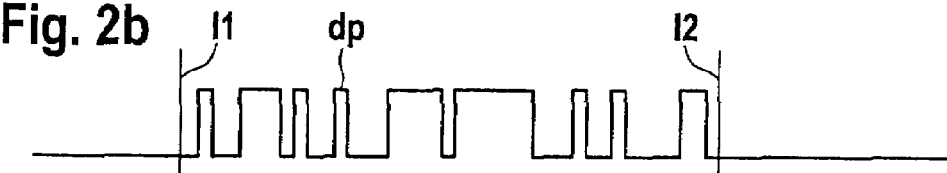
FIG. 2b shows a data packet.
Figure 2C:
FIG. 2c shows an envelope signal covering said data packet.
Figure 2A:
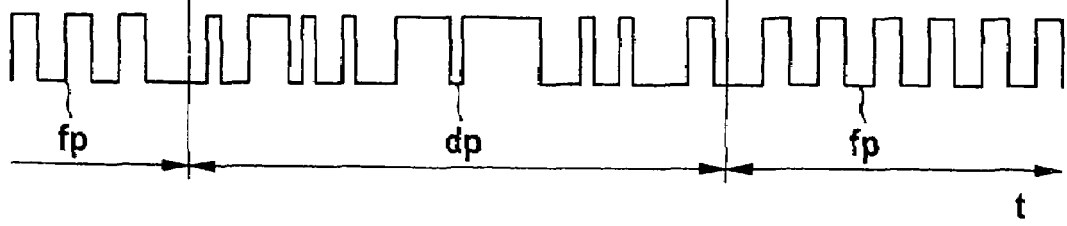
FIG. 2a shows a packet data stream including filler patterns as output by a packet data source.

The laser device 100 further comprises a packet data source 110 for outputting a packet data stream as shown in FIG. 2a). The two vertical lines 11, 12 in FIG. 2 represent the limits of one time slot; within said time slot the packet data stream comprises a data packet dp as shown in FIG. 2b.

The laser device 100, preferably the packet data source 110 comprises a filter means 112 for generating an envelope signal as shown in FIG. 2c of the data packets dp in said packet data stream. Moreover it comprises a switching means 114 for switching the laser driver 120 in response to said envelope signal. When switching the laser driver 120 in response to said envelope signal, the laser light source 130 is also switched by the laser driver 130 in response to said envelope signal. Said envelope signal represents an enabling signal for the laser light source. In the case that the laser light source 130 is enabled, the laser light beam, output by said laser light source, has a constant high intensity. To the contrary, if the laser light source is disabled by said envelope signal, it does output no light at all. Consequently, even in burst mode systems where a plurality of laser devices and in particular laser light sources transmit laser light beams of an identical wavelength over the same channel, no misinterpretation of the information carried by the laser light beams is possible during time slots in which most or all the laser devices are disabled.

Referring back to FIG. 1 the laser device further comprises a modulator driver 150 for receiving said packet data stream according to FIG. 2a output by said packet data source 110 and for driving or controlling said optical modulator means 140 in response to said packet data stream. This is done in order to enable the optical modulator means 140 to modulate the laser light beam in response to said packet data stream when the laser light source is switched on according to said envelope signal.

The data packet dp within one time slot as shown in FIG. 2b has a constant component which does not vary within said time slot. However, typically a data stream does not only comprise time slots having data packets but also comprises an undefined or arbitrary number of gaps between each data packet. Due to said arbitrary number of gaps between said data packets within the data stream, the constant component of the data stream varies over the time. In order to avoid this, filler patterns fp preferably having an identical constant component like the data packets are provided instead of the gaps between data packets. Such filler patterns fp are shown in FIG. 2a on the right hand side and on the left hand side of the shown time slot comprising the data packet. Due to this, the data stream shown in FIG. 2a has a constant component which does not vary over the time. The amount of said constant component is unremarkable and may be ignored because it does not comprise any information. Thus, the modulator driver 150 must not be embodied to transmit said constant component correctly. This is schematically indicated by the capacitor 155 provided between the packet data source 110 and the modulator driver 150. The filler patterns are not modulated by the optical modulator means 140 onto said optical fiber 160, because at the times when they occur in the data stream signal, the laser light source 130 is disabled by said envelope signal.

SECOND EMBODIMENT

The laser device according to the first embodiment suffers from fluctuations of the thermal expansion of the laser light source 130. These fluctuations are caused by the fact that the laser light source is switched on and off in response to the envelope signal. When it is switched on, its thermal consumption and its thermal expansion are high, whereas during the time when it is switched off it is cooled down and suffers a thermal concentration. The resulting thermal fluctuations cause proportional variations in the wavelength of the laser light beam output by said laser light source, because the distance between two opposing mirrors within said laser light source 130 responsible for the wavelength varies accordingly. These variations in the wavelength mean variations in the carrier frequency of the transmitted signal and cause problems in correctly detecting information modulated on such carrier frequencies, in particular in systems where different carrier frequencies are transmitted via one channel.

Figure 3:
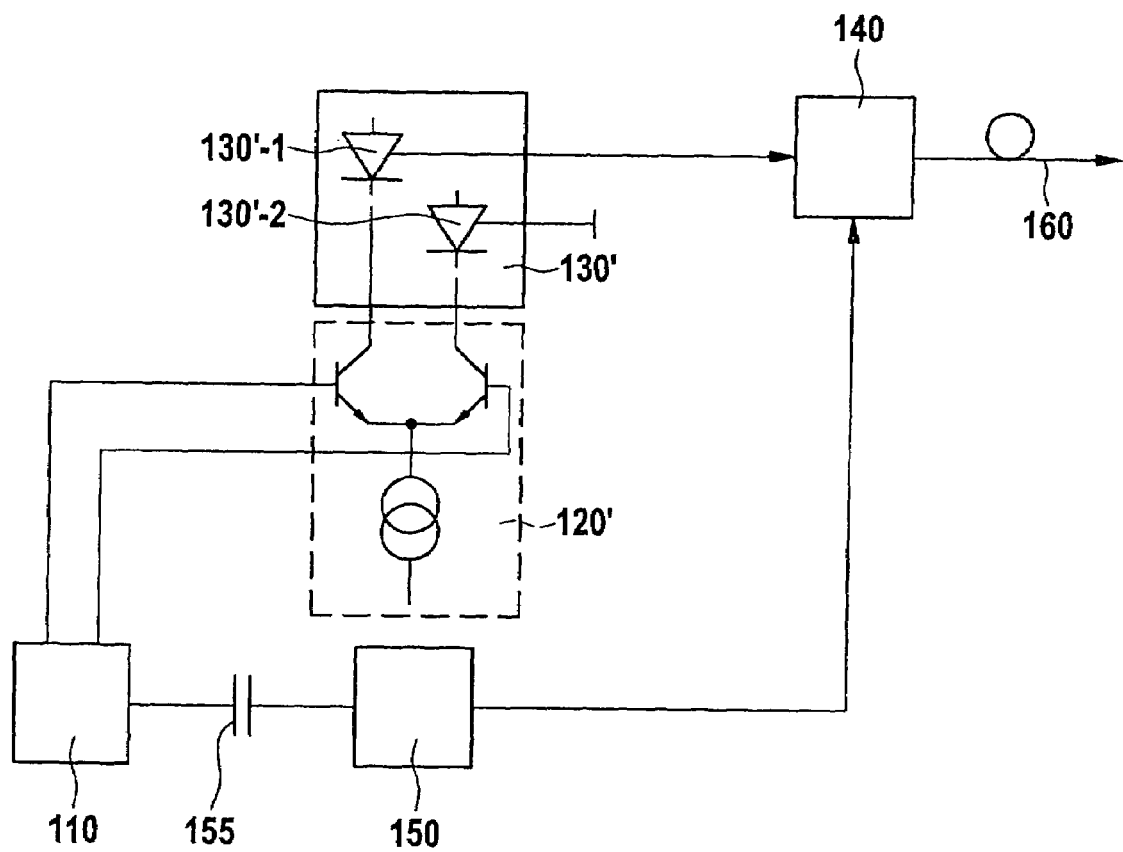
FIG. 3 shows a second embodiment of the laser device according to the invention.

The second embodiment of the laser device as shown in FIG. 3 overcomes said problem by embodying the laser light source 130 as a dual power consuming unit comprising an active laser light source element 130'-1, for outputting the switched laser light beam as first power consuming element and a second power consuming element 130'-2. Those elements preferably have identical electrical parameters and identical thermal losses and both are thermally coupled. They are preferably embodied on one chip.

For driving such a laser light source 130' the laser driver 120' is embodied as differential driver for driving both power consuming elements 130'-1, 130'-2 in a complementary manner such that the sum of their driving currents is constant in the range of the thermal time constant of said dual power consuming unit. Preferably, the second power consuming element 130'-2 is embodied as blind laser light source element. Contrary to the active laser light source element, the blind laser light source element does not output a laser light beam but just represents a complementary power consuming element.

Embodying the laser light source 130' in such a manner and driving said laser light source in the described complementary manner has the advantage, that the power consumption and thus also the thermal expansion of the laser light source embodied as dual power consuming unit as a whole does not vary over the time, even if the active laser light source element 130'-1 is switched on and off in response to the envelope signal. The fluctuations of the thermal expansion of said active laser light source element are at least substantially compensated by the complementary fluctuations of the thermal expansion of the second power consuming element 130'-2. Consequently, the wavelength of the laser light beam output by said active laser light source element 130'-1 is constant over the time, even when the laser light source element is switched in response to the envelope signal.

In said second embodiment the packet data source 110', the filter means 112' and the switching means 114' have the same functions as described above by referring to FIG. 1; however they have been adapted to the requirements of the differential driver 120'.

Even without embodying the laser light source 130 as a dual power consuming unit, the described disadvantage of the thermal fluctuations of the laser light source may be weakened or avoided by improving a coupling between the laser light source and a thermistor, which is nowadays provided within available laser devices for carrying out a temperature controlling. Another way to weaken or avoid the described disadvantage would be to reduce the thermal capacity of a Peltier cooler also provided within available laser devices. Another improvement can be reached by a forward coupling of the envelope signal to the Peltier cooler setpoint. Each of the methods proposed as third embodiment may—taken alone or in combination —help to avoid that the traffic dependent thermal fluctuations and the resulting fluctuations in the wavelength are in the worst case on the limit of one grid spacing, that means the minimum difference between two wavelengths of two adjacent channels as defined by the international telecommunication unit ITU.

THIRD EMBODIMENT

In the prior art loser devices for optical packet data transmission in dense wavelength division multiplex DWDM-systems are known. They typically comprise a laser light source 130' for outputting a laser light beam, for example onto an optical fiber 160, see FIG. 4. They further comprise a loser driver 120' for driving said loser light source 130' and a packet data source 110' for outputting a packet data stream, wherein the laser light beam output by said laser light source 130'-1 is directly modulated in response to said pocket data stream. Said known laser devices suffer from the variation of the wavelength of the laser light beam caused by fluctuations of the thermal expansion of the laser light source as described above by referring to the second embodiment.

Figure 4:
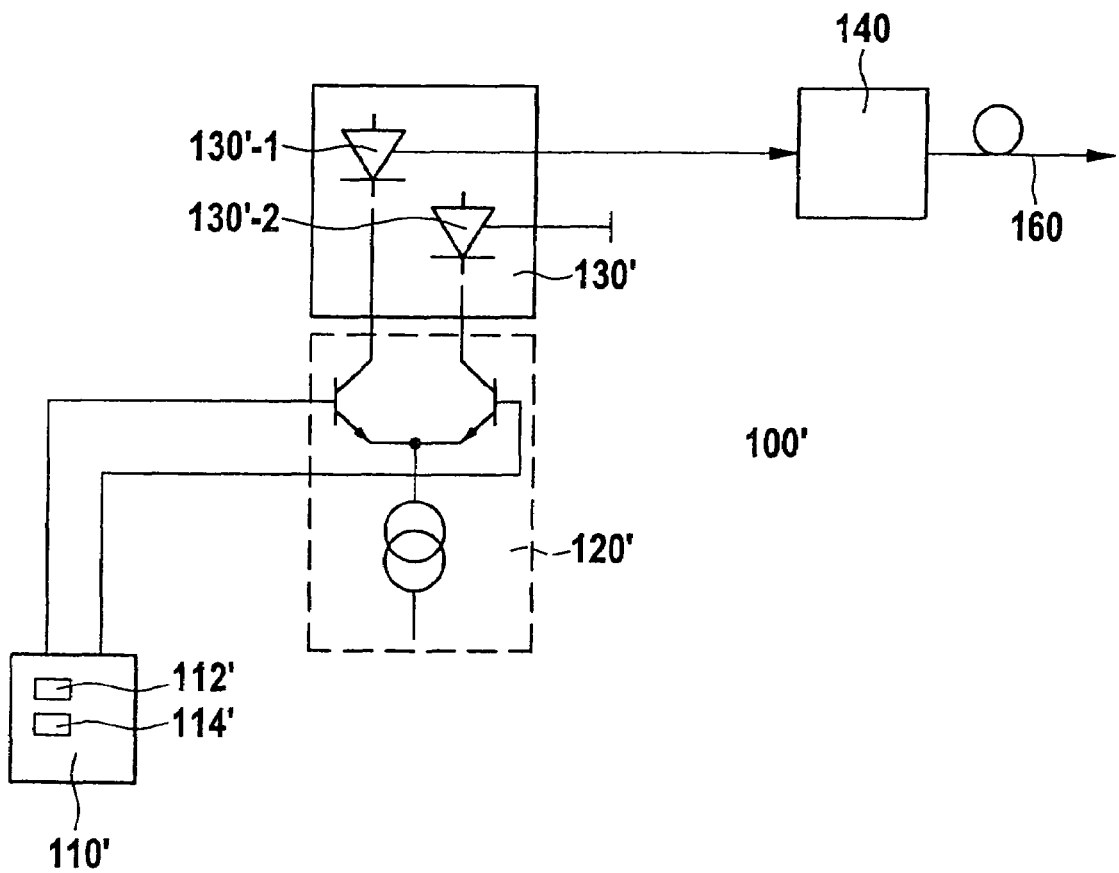
FIG. 4 shows a third embodiment of the laser device according to the invention.

In order to overcome said disadvantage it is proposed to embody the laser light source of said laser device as a dual power consumption unit, preferably on one chip, see FIG. 4. Said power consuming unit 130' comprises an active light source element 130'-1 for outputting the modulating laser light beam as first power consuming element 130'-1 and a second power consuming element 130'-2 wherein both elements have identical electrical parameters and thermal losses and both are thermally coupled. Further, the loser driver 120' of the laser device 100', is embodied as a differential driver for driving both elements 130'-1, 130'-2 in a complementary manner such that the sum of their driving currents is constant in the range of the thermal time constant of said dual power consuming unit 130'. Preferably, the second power consuming element 130'-2 is embodied as blind laser source element.

Figure 5:
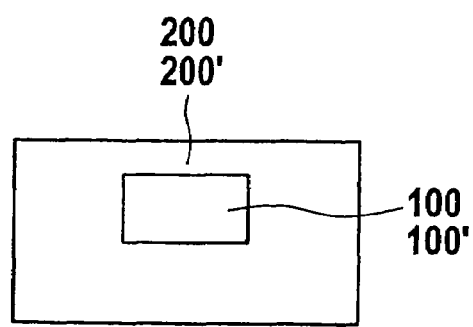
FIG. 5 shows an optical transmitter according to the invention.

FIG. 5 shows an optical transmitter 200, 200' in a TDM-system, in particular in a DWDM-system, comprising a laser device 130 or 130' as described above for outputting a laser light beam being modulated in response to a packet data stream onto an optical fiber 160.

The invention claimed is:

1. Laser device for optical packet data transmission in TDM-systems, comprising: a laser light source for outputting laser light beam and a laser driver for driving said laser light source; an optical modulator means for receiving and modulating the laser light beam output by said laser light source; a packet data source for outputting a packet data stream; and a modulator driver for receiving said packet data stream output by said packet data source and for driving said optical modulator means in response to said packet data stream resulting in that the optical modulator means modulates the laser light beam in response to said packet data stream; wherein a filter means for generating an envelope signal of the data packets in said packet data stream; and a switching means for switching the laser driver in response to said envelope signal.

2. Laser device according to claim 1, characterized in that the packet data stream comprises filler patterns between its data packets.

3. Laser device according to claim 1 characterized in that the laser light source is embodied as a dual power consuming unit comprising an active laser light source element for outputting the switched laser light beam as first power consuming element and a second power consuming element, wherein both elements have identical electrical parameters and thermal losses and both are thightly thermally coupled; and the laser driver is embodied as differential driver for driving both elements in a complementary manner such that the sum of their driving currents is constant in the range of the thermal time constant of said dual power consuming unit.

4. Laser device according to claim 3, characterized in that the second power consuming element is embodied as blind laser light source element.

5. Optical transmitter in a TDM-system in particular in a DWDM-system, comprising a laser device according to claim 1 for outputting a laser light beam being modulated in response to a packet data stream onto an optical fiber.

6. Laser device for optical packet data transmission in DWDM-systems, comprising: a laser light source for outputting a laser light beam; a laser driver for driving said laser light source; and a packet data source for outputting a packet data stream, wherein the laser light beam output by said laser light source is modulated in response to said packet data stream; characterized in that the laser light source is embodied as a dual power consuming unit comprising an active laser light source element for outputting the modulated laser light beam as first power consuming element and a second power consuming element, wherein both elements have identical electrical parameters and thermal losses and both are tightly thermally coupled; and the laser driver is embodied as differential driver for driving both elements in a complementary manner such that the sum of their driving currents is constant in the range of the thermal time constant of said dual power consuming unit.

7. Laser device according to claim 6, characterized in that it further comprises: a filter means for generating an envelope signal of the data packets in said packet data stream; a switching means for switching the differential laser driver in a complementary manner in response to said envelope signal, resulting in that said laser light source is driven by said laser driver in response to said envelope signal, too; an optical modulator means for receiving the switched laser light beam output by said laser light source; and a modulator driver for receiving the packet data stream output by the packet data source and for driving said optical modulator means in response to said packet data stream resulting in that the optical modulator means modulates the laser beam in response to said packet data stream.

8. Laser device, according to claim 7, characterized in that the packet data stream comprises filler patterns between its data packets.

9. Optical transmitter in a TDM-system, in particular a DWDM-system, comprising: a laser device according to claim 6 for outputting a laser light beam being modulated in response to a packet data stream onto an optical fiber.

* * * * *